H. E HALLER.
PIPE JOINT.
APPLICATION FILED JAN. 16, 1917.
1,246,091.
Patented Nov. 13, 1917.
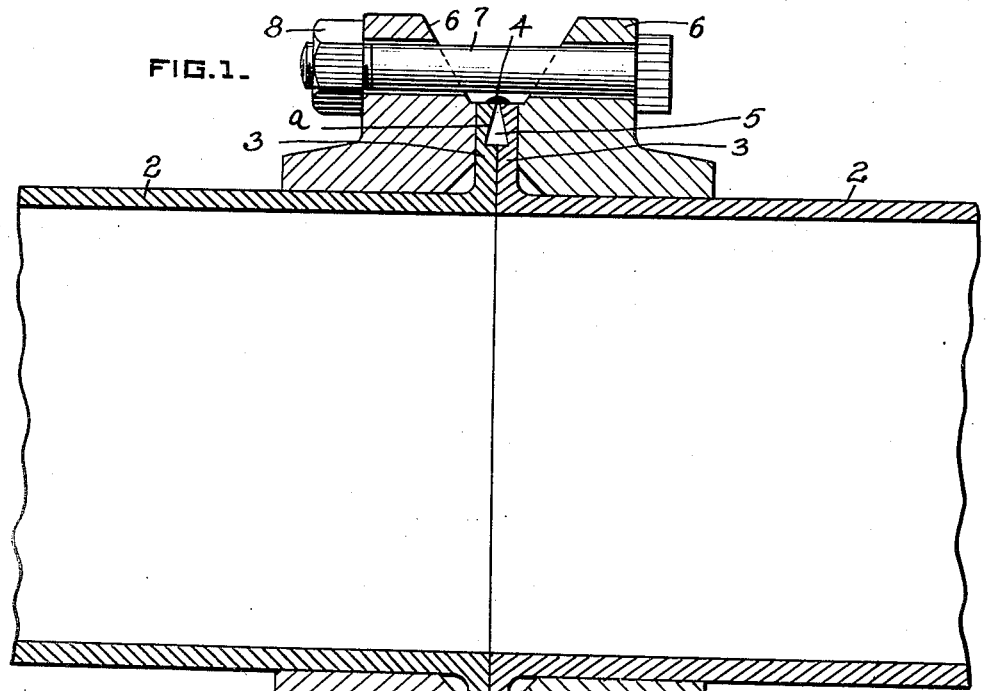
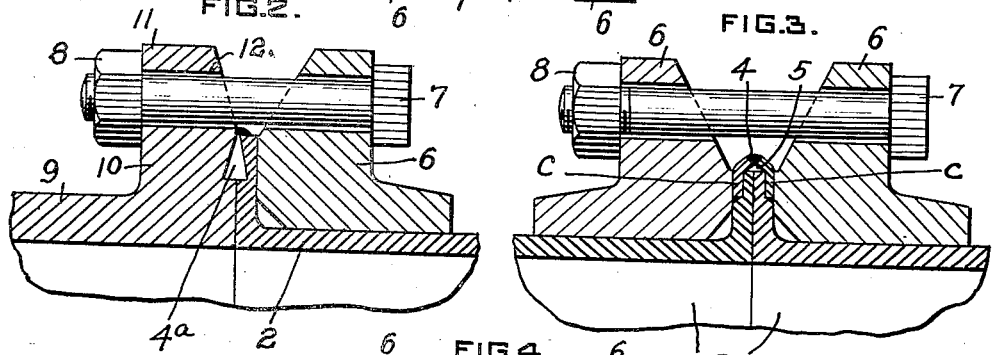
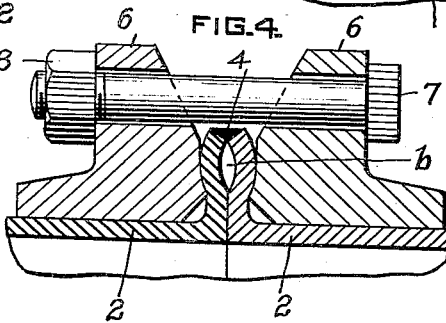
WITNESSES
INVENTOR
Henry E. Haller

UNITED STATES PATENT OFFICE.

HENRY E. HALLER, OF PITTSBURGH, PENNSYLVANIA.

PIPE-JOINT.

1,246,091.   Specification of Letters Patent.   Patented Nov. 13, 1917.

Application filed January 16, 1917. Serial No. 142,631.

*To all whom it may concern:*

Be it known that I, HENRY E. HALLER, a citizen of the United States, residing at Pittsburgh, in the county of Allegheny and State of Pennsylvania, have invented certain new and useful Improvements in Pipe-Joints, of which the following is a specification.

My invention relates to improvements in pipe joints or pipe couplings designed to unite the meeting ends of pipe sections and to connect an end of a pipe section with fittings and valve bodies, and particularly a flanged pipe section with a flanged fitting or body.

A primary object of the present invention is to provide a structure of the class mentioned that is simple in construction and efficient in operation, and at the same time of such a character as to permit a disconnection of the connected sections or a section and a fitting without destroying or injuring the connected parts.

In structures of the type of the present invention, it has been found highly desirable to bind the abutting elements of the members to be connected by welding said members together, and my invention includes this mode of construction as well as a provision of means whereby the connected parts may be separated without injury to said parts.

In the accompanying drawings which illustrate applications of my invention,

Figure 1 is a longitudinal sectional view of one form of my joint structure;

Fig. 2 is a detail sectional view showing a portion of a fitting and an end of a pipe section connected thereto;

Figs. 3 and 4 are detail sectional views showing modifications of the form of Fig. 1.

Referring to the drawings, 2—2 designate two adjacent pipe sections adapted to be coupled together; each section is provided at its end with a flange 3, said flanges constituting, when the parts are assembled, abutting elements of the joint structure.

In practice, the peripheral edges of the abutting elements or flanges, or in some instances projections thereof, are bound together by welding, the weld being indicated by the numeral 4.

In all forms of my invention, as illustrated, I provide means for forming a pocket or recess 5 adjacent to and inwardly of the weld 4. Thus, in the form of Fig. 1, each flange is cut away as indicated at *a* while in the form of Fig. 4, I provide by a rolling or other process, a recess portion *b*. In some instances, it may be desirable to provide the abutting elements or flanges with a projecting member and to make the line of weld above the peripheral edges of the flanges. This may be accomplished by welding a separate piece or member *c* to each flanged portion of the sections. This construction is shown by Fig. 3. In this form, the outer ends of the element *c* are bent toward each other and are welded together, the pocket or recess 5 in this instance being disposed immediately above the peripheral edges of the flanges.

It will be apparent from the constructions herein shown and described that when it is necessary to disconnect the sections for any reason, the weld may be removed without injury to the flanges or other parts of the joint structure. The provision of means for accomplishing this purpose constitute an important and characteristic feature of the present invention.

In addition to the parts above described, the joint structure of my invention includes a pair of coupling rings or collars 6 having inner faces designed to bear against outer faces of the flanges or abutting portions of the joint structure, said coupling rings being adapted to be drawn toward each other and into close contact with the said flanges by means of bolts 7 and nuts 8 of the usual construction.

In the form of Fig. 2 which shows an application of my invention in connection with a fitting or valve end 9, said fitting 9 being formed with a flange 10, the outer portion 11 of which is formed with an aperture 12, the pocket or recess 4ª is formed by complementary cut-away portions formed respectively in the flange of the pipe section and the flange of the setting.

What I claim is:—

1. A pipe joint structure comprising two abutting elements one of which is a pipe section, a weld binding said elements together, said structure having a pocket or recess formed adjacent to the line of weld.

2. A pipe joint structure comprising two abutting elements one of which is a pipe section, a weld binding said elements together, said structure having a pocket or recess formed adjacent to the line of weld, coupling members, and means for uniting the coupling members.

3. A pipe joint structure comprising two flanged pipe sections with the flanges disposed in abutting relation, a weld binding said flanges together, said flanges having means forming a pocket or recess adjacent to the line of weld.

4. A pipe joint structure comprising two flanged pipe sections with the flanges disposed in abutting relation, a weld binding said flanges together, said flanges having means forming a pocket or recess adjacent to the line of weld, ring coupling members encircling the ends of the pipe sections, and means for drawing the coupling rings toward each other.

In testimony whereof I affix my signature in presence of two witnesses.

HENRY E. HALLER.

Witnesses:
 LOIS WINEMAN,
 ALICE B. DICE.